US009577807B2

(12) United States Patent
Kalhan

(10) Patent No.: US 9,577,807 B2
(45) Date of Patent: Feb. 21, 2017

(54) CONTROL DATA TRANSMISSION OVER A DATA CHANNEL BY A CONTROLLING BASE STATION

(75) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1691 days.

(21) Appl. No.: 12/782,479

(22) Filed: May 18, 2010

(65) Prior Publication Data

US 2011/0286426 A1  Nov. 24, 2011

(51) Int. Cl.
*H04J 4/00* (2006.01)
*H04L 5/00* (2006.01)

(52) U.S. Cl.
CPC .......... *H04L 5/0053* (2013.01); *H04L 5/0032* (2013.01); *H04L 5/0091* (2013.01)

(58) Field of Classification Search
USPC ............ 370/310, 310.2, 328, 330, 331, 345, 343,370/465, 431, 478, 338
See application file for complete search history.

(56) References Cited

U.S. PATENT DOCUMENTS

2011/0170496 A1*  7/2011  Fong et al. ............... 370/329
2012/0127954 A1*  5/2012  Lim et al. ................ 370/330

FOREIGN PATENT DOCUMENTS

| EP | 1474495 A1 | 10/2007 |
| EP | 2088790 A1 | 12/2009 |
| WO | 2007/024012 A1 | 3/2007 |

OTHER PUBLICATIONS

3GPP TSG-RAN1 # 56, Efficient HARQ Protocol for SIC based DL CoMP, Fujitsu, Feb. 9-13, 2009.*

* cited by examiner

*Primary Examiner* — Anh Ngoc Nguyen

(57) ABSTRACT

A controlling base station sends, to a wireless communication device, control data related to communication between a communication base station and the wireless communication device. The control data is transmitted in accordance with a communication specification and is transmitted to allow reception by the wireless communication device of the control data within a data channel having a frequency and time allocated by the communication specification for the wireless communication device to receive data transmissions from the communication base station.

21 Claims, 10 Drawing Sheets

CONTROL DATA TRANSMISSION OVER A DATA CHANNEL BY A CONTROLLING BASE STATION

BACKGROUND

The invention relates in general to wireless communication systems and more specifically to managing control signals in a wireless communication system.

Base stations in cellular communication systems provide communications services to wireless communication devices within geographical cells where each base station exchanges signals with wireless communication devices within an associated cell. The size and shape of each cell and, therefore, the coverage area of the base station are determined by several factors and are at least partially based on design parameters of the base station. In addition to large macro cells that provide services to numerous devices within relatively large geographical areas, some cellular communication systems are increasingly employing smaller cells to increase efficiency, improve coverage, improve the quality of service, and provide additional services. The smaller cells may include a variety of sizes typically referred to as microcells, picocells and femtocells. Microcells and picocells are often implemented within office buildings, shopping centers and urban areas in order to provide additional security, higher user capacity for the area, additional service features, and/or improved quality of service. Femtocells have relatively smaller geographical areas and are typically implemented at residences or small office locations. Since typical cellular backhaul resources may not be available in these locations, femtocells are sometimes connected to the cellular infrastructure through DSL or cable modems. Femtocells are part of the cellular network and, therefore, communicate with the wireless devices using the same techniques as those used by macrocells. The proximity of the various base stations and wireless communication devices often results in interference. In addition interference of data communications, control channels may also suffer performance degradation due to interference.

SUMMARY

A controlling base station sends, to a wireless communication device, control data related to communication between a communication base station and the wireless communication device. The control data is transmitted in accordance with a communication specification and is transmitted to allow reception by the wireless communication device of the control data within a data channel having a frequency and time allocated by the communication specification for the wireless communication device to receive data transmissions from the communication base station.

DETAILED DESCRIPTION

Figure 1:
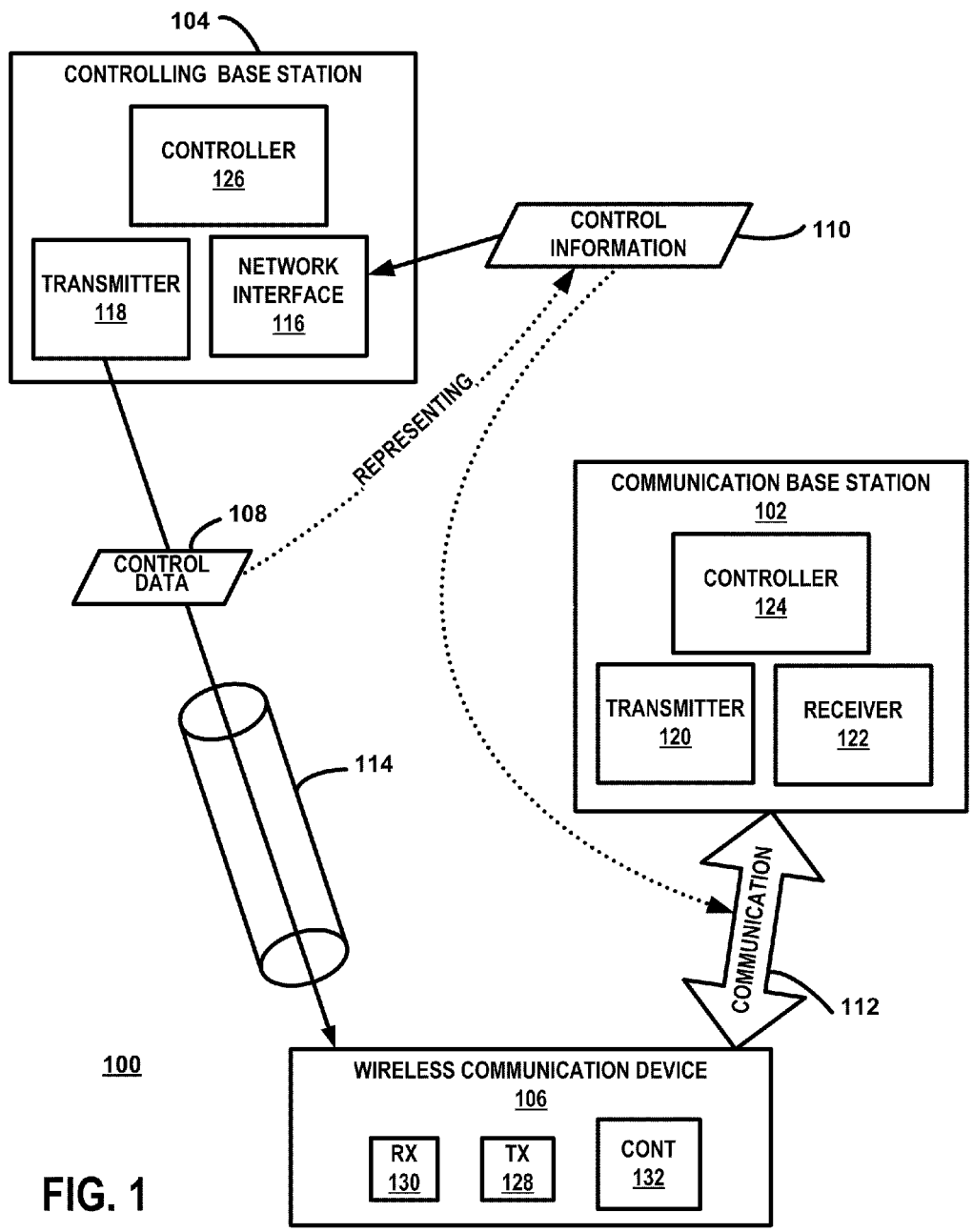
FIG. 1 is a block diagram of a communication system in accordance with an exemplary embodiment of the invention.

FIG. 1 is a block diagram of a communication system 100 in accordance with an exemplary embodiment of the invention. The communication system 100 may be implemented in accordance with any of numerous technologies and communication standards. For the examples discussed below, the system 100 operates in accordance with an orthogonal frequency division multiplex (OFDM) standard. The various functions and operations of the blocks described with reference to the communication system 100 may be implemented in any number of devices, circuits, and/or elements as well as with various forms of executable code such as software and firmware. Two or more of the functional blocks of FIG. 1 may be integrated in a single device and the functions described as performed in any single device may be implemented over several devices.

The system 100 includes at least two base stations 102, 104 and a wireless communication device 106. In most circumstances, several base stations are connected to a network controller through network infrastructure to provide wireless communication services to multiple wireless communication devices. The base stations 102, 104 include wireless transceivers that exchange wireless signals with the wireless communication devices. Transmissions from the base stations and from the wireless communication device are governed by a communication specification that defines communication rules and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for a downlink control channel from a base station to a wireless communication device. In an OFDM based system, a channel can be defined by allocating specific frequency-time resources. The granularity of these depends on the specification and design of the system. Although a particular implementation may further specify frequency, timing and coding parameters for each base station and/or wireless communication device, conventional systems assume that only the base station transmits control data within the defined control channel between the base station and the wireless communication device exchanging data with that particular base station.

In the exemplary embodiments discussed herein, however, the control data 108 that represents control information 110 related to the communication 112 between a communication base station 102 and the wireless communication device 106 is transmitted by a controlling base station 104. The controlling base station 104 transmits the control data 108 within the data channel 114 allocated by the communication specification for data transmissions from the base stations to the wireless communication devices. Accordingly, the data channel 114 is defined at least in terms of frequency and time. In conventional systems, the control signals are transmitted by the base stations within a control channel defined by the communication specification. Control signals that are intended for specific wireless communication devices are further coded with coding unique to the wireless communication device. The serial number or device ID, for example, may be used to generate a pseudorandom code that is applied to signal that is transmitted within the time period and frequency band defined by the control channel. For the examples discusses herein, the control signals for controlling communication between a wireless communication device and one base station (communication base station 102) are transmitted by another base station (controlling base station 104) through a data channel defined by the communication specification.

The communication 112 between the communication base station 102 and the wireless communication device 106 may be uplink data communication, uplink control communication, downlink data communication, and/or downlink control information. The control information indicates parameters related to the communication 112 which allows the wireless communication device 106 to send and receive signals. The parameters include timing, frequency, coding and/or power level information. In a 3GPP LTE system, for example, the control information 110 indicates the subcarrier tones and symbols containing information directed to the wireless communication device 106. In accordance with the exemplary embodiment, therefore, the wireless communication device 106 receives signals from the controlling base station 104 containing information that allows the wireless communication device 106 to receive data from the communication base station 102. The control information may also enable transmission of data or uplink control information to the communication base station 102. In the exemplary embodiment, the control information 110 conveyed by the control data 108 sent by the controlling base station 104 is the same or similar to control information 110 that would have been transmitted by the communication base station 102 in a conventional system. The control data 108, therefore, represents the control information 110.

The control information 110 is received at the controlling base station 104 through a network interface 116. Although some control information may be generated by a network controller in some circumstances, the control information 110 is information that the communication base station 102 should communicate to the wireless communication device 106. Accordingly, the communication base station 112 transmits the control information 110 to the controlling base station 104 which receives the control information 110 through the network interface 116. In some situations where control information is generated by a network controller, the control information is sent directly from the network controller to the controlling base station 104. In circumstances where the controlling base station 104 is allocating resources and has a central scheduler, the communication base station 102 may send some basic indications that would assist the controlling base station 104 to formulate the control information for the device 106. As described below with reference to FIG. 2 and FIG. 3, the control information 110 may be sent directly to the controlling base station 104 through a connection using X2 signaling where available or may be sent through a core network and connections using S1 signaling. In some circumstances, a wireless backhaul is used for communication between one or more base stations and the core network.

The controlling base station 104 generates a downlink transmission signal that includes the control data 108 representing the control information 110. In some circumstances, the control information 110 is the control data 108 although the control data 108 may be derived from the control information 110 and is not identical to the control information 110 in other situations. A transmitter 118 in the controlling base station 104 transmits the downlink signal including the control data 108 to the wireless communication device 106. The downlink transmission from the controlling base station 104 includes data directed to wireless communication devices receiving data from the controlling base station 104 and also includes control data 108 for wireless communication devices (such as wireless communication device 106) receiving data from other base stations but receiving control data from the controlling base station 104 through the data channel.

Accordingly, the controlling base station 104 also provides wireless service to other wireless communication devices and, therefore, transmits data and control signals to the wireless communication devices it is serving as well as transmitting the control data 108 to the wireless communication device through the data channel 114 specified by the communication specification. Since the wireless communication device 106 is within the geographical service area and coverage of the controlling base station, the wireless communication device is capable of receiving the control data from the controlling base station.

The communication base station 102 includes circuitry for performing the functions described above and which can be described as transmitter 120, receiver 122, and a controller 124. As discussed with reference to FIG. 2 and FIG. 3, the communication base station also includes a network interface. The controller 124 is any processor, processor arrangement, or computer that can execute code to control devices within the communication base station 102 to perform the functions described herein as well as facilitating the overall functionality of the communication base station 102. The receiver 122 is configured to receive wireless signals from wireless communication devices and performs demodulation, descrambling, filtering, and other tasks to recover data or control information. In the exemplary embodiment, the receiver operates in accordance with a 3GPP LTE communication specification. The transmitter 120 is configured to transmit wireless signals to wireless communication devices and performs modulation, scrambling, filtering, and other tasks to format and transmit data and control information. In the exemplary embodiment, the transmitter 120 operates in accordance with a 3GPP LTE communication specification.

The controlling base station 104 includes circuitry for performing the functions described above and which can be described as the network interface 116, the transmitter 118 and a controller 126. The controlling base station 104 also includes a receiver (not shown) in most circumstances. The controller 126 is any processor, processor arrangement, or computer that can execute code to control devices within the controlling base station 104 to perform the functions described herein as well as facilitating the overall functionality of the controlling base station 104. The transmitter 118 is configured to transmit wireless signals to wireless communication devices and performs modulation, scrambling, filtering, and other tasks to format and transmit data and control information. In the exemplary embodiment, the transmitter 118 operates in accordance with a 3GPP LTE communication specification.

The wireless communication device 106 includes circuitry for performing the functions described above and which can be described as transmitter 128, receiver 130, and a controller 132. The controller 132 is any processor, processor arrangement, or computer that can execute code to control devices within the wireless communication device 106 to perform the functions described herein as well as facilitating the overall functionality of the wireless communication device 106. The receiver 130 is configured to receive wireless signals from base stations and performs demodulation, descrambling, filtering, and other tasks to recover data or control information. In the exemplary embodiment, the receiver operates in accordance with a 3GPP LTE communication specification. The transmitter 128 is configured to transmit wireless signals to base stations and performs modulation, scrambling, filtering, and other tasks to format and transmit data and control information. In the exemplary embodiment, the transmitter 128 operates in accordance with an LTE communication specification.

Figure 2:
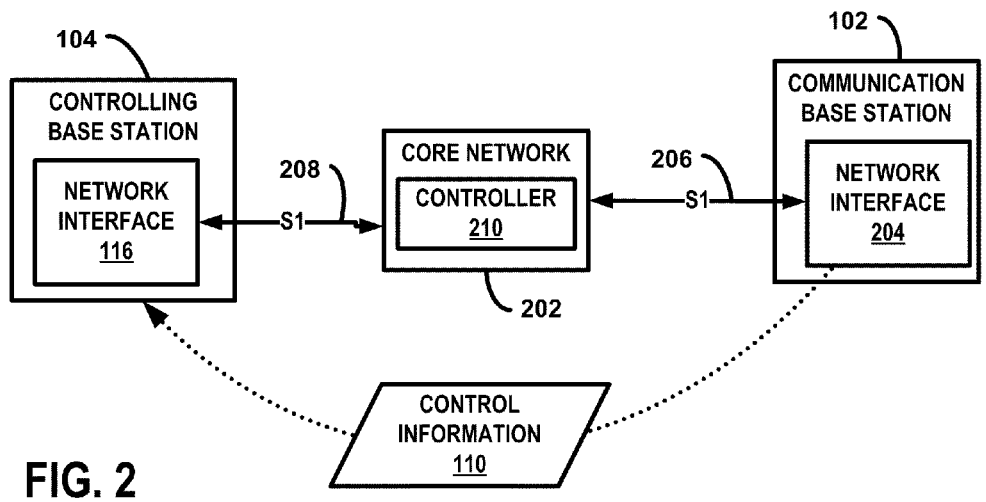
FIG. 2 is a block diagram of the communication base station connected to the controlling base station through a core network.

FIG. 2 is a block diagram of the communication base station 102 connected to the controlling base station 104 through a core network 202. The communication base station 102 includes a network interface 204 that is connected to a communication link 206 that uses S1 signaling to exchange information between the communication base station 102 and the core network 202. The network interface 116 in the controlling base station 204 is connected to the core network 202 by a communication link 208 that also uses S1 signaling. The network interfaces 116, 204 transmit and receive messages in accordance with the S1 signaling protocol to establish communication between the core network 202 and the base stations. The communication links 206, 208 may include any combination of wireless and/or wired backhaul transmission media and equipment.

The core network 202 includes a controller 210 that manages communications through the core network 202. The controller 210 may be any combination of processors, servers, and other equipment and may be geographically distributed. In some circumstances, the messages between the controlling base station 104 and the communication base station 104 are forwarded through the core network 202 with minimal processing by the controller 210. In other circumstances, the controller 210 may perform network management functions and may interpret the messages and make decisions regarding the content of messages sent to the base stations. The level of processing and network management by the controller 210 may vary anywhere between simply forwarding messages and full network management.

Accordingly, the control information 110 is either directly forwarded to the controlling base station from the communication base station, slightly modified and forwarded, or interpreted and processed to generate control information 110 based on the control information transmitted by the communication base station 102.

Figure 3:
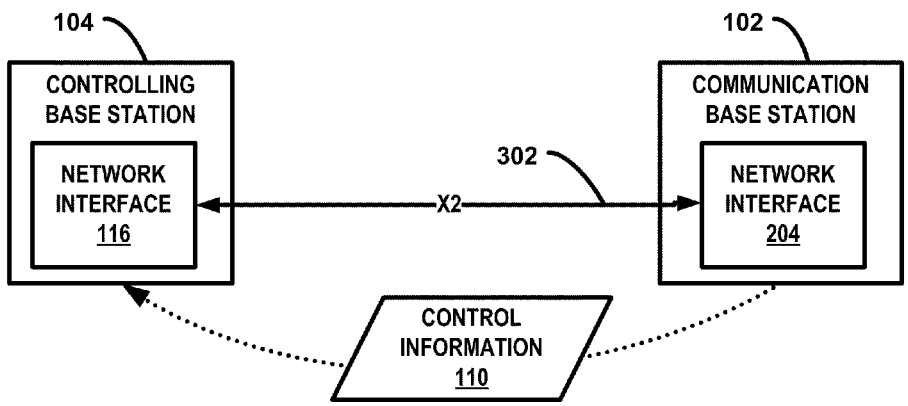
FIG. 3 is a block diagram of the communication base station connected to the controlling base station through a communication link using X2 signaling.

FIG. 3 is a block diagram of the communication base station 102 connected to the controlling base station 104 through a communication link 302 using X2 signaling. The network interface 204 is connected to the communication link 302 that uses X2 signaling to exchange information between the communication base station 102 and the controlling base station 104. The communication links 302 may include any combination of wireless and/or wired backhaul transmission media and equipment. For this example, the control information 110 is directly transmitted from the communication base station 102 to the controlling base station 104. The X2 and S1 signaling protocols are defined by the 3GPP LTE communication specification protocols. In situations where the communication base station is a Femto eNodeB, other backhaul signaling protocols are used.

Figures 4A, 4B:
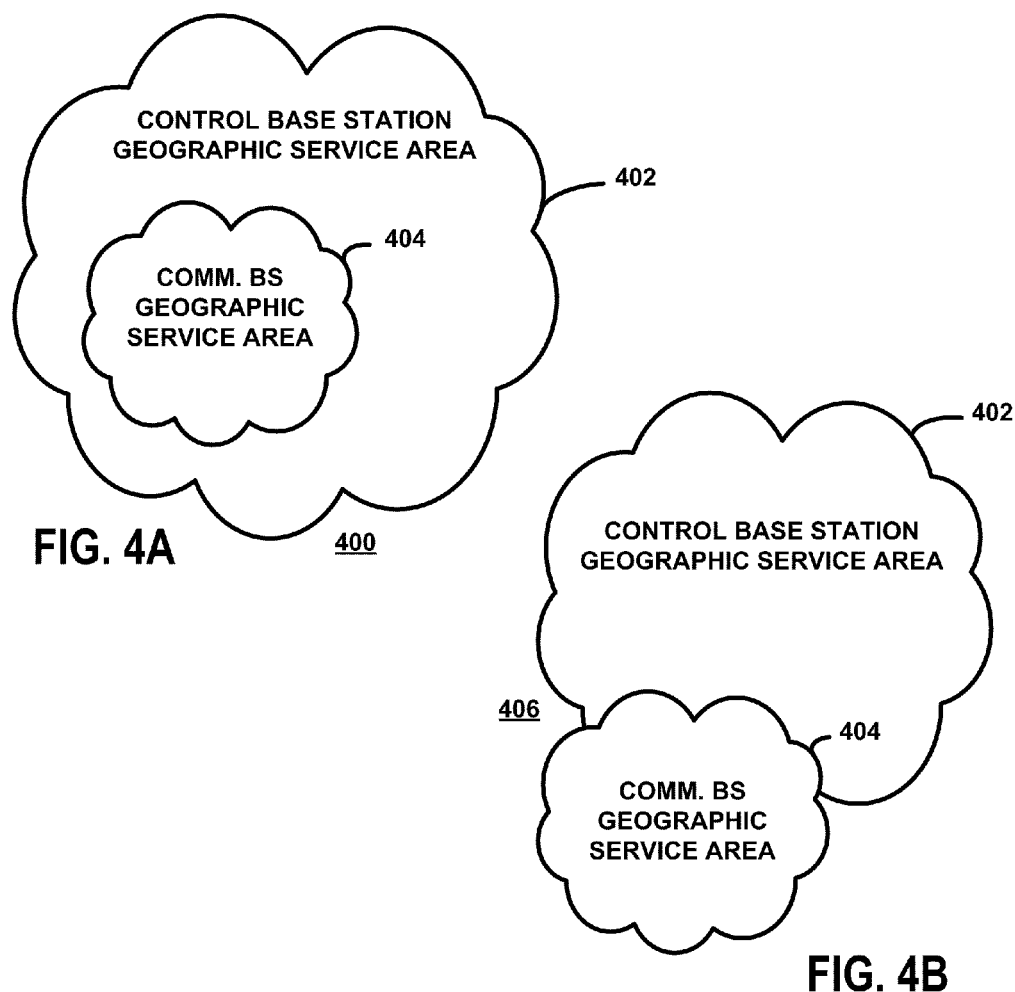
FIG. 4A is an illustration of an exemplary geographical service area relationship provided by a controlling base station and communication base station where the geographic service area of a communication base station is within a controlling geographic service area of the controlling base station.
FIG. 4B is an illustration of an exemplary geographical service area relationship provided by the controlling base station and the communication base station where the geographic service area of a controlling base station overlaps with the communication geographic service area of the communication base station.

FIG. 4A and FIG. 4B are depictions of exemplary geographical service area relationships 400, 406 provided by the communication base station 102 and the controlling base station 104. The controlling base station 104 is capable of providing wireless service to wireless communication devices within a control base station geographical service area 402 and the communication base station 102 is capable of providing wireless service to wireless communication devices within a communication base station geographic service area 404. Accordingly, a geographic service area is the coverage area of the base station. The control base station geographical service area 402 and the communication base station geographic service area 404 may have any of numerous shapes, sizes, and configurations. Accordingly, the clouds representing the service areas generally illustrate the relationships between the service areas and do not necessarily depict the actual shapes of the service areas. Further, the service areas may contain holes of coverage where service is unavailable. In the interest of clarity and brevity, such features are not illustrated in the figures. In FIG. 4A, the service area 404 of the communication base station 102 is completely within the service area 402 provided by the controlling base station 104. Such service area relationships 400 often occur where some base stations within the communication system provide smaller service regions such as microcell, picocell, and femtocell configurations. A femtocell arrangement, for example, may include a femtocell base station (communication base station 104) located at a residence where the femtocell is a service area for devices used by device users living at the residence. When the wireless communication devices are outside the service area 404, service is provided by larger macrocells (e.g. controlling base station 104). When the authorized wireless communication device is at the residence, however, service is provided by the base station presenting the smaller femtocell service area 404. Accordingly, in most situations, the service area 404 of the communication base station 102 will be completely within the service area 402 of the controlling base station 104. In some situations, however the service area 404 may be partially overlapping with the service area 402 as shown in FIG. 4B.

Figure 5:
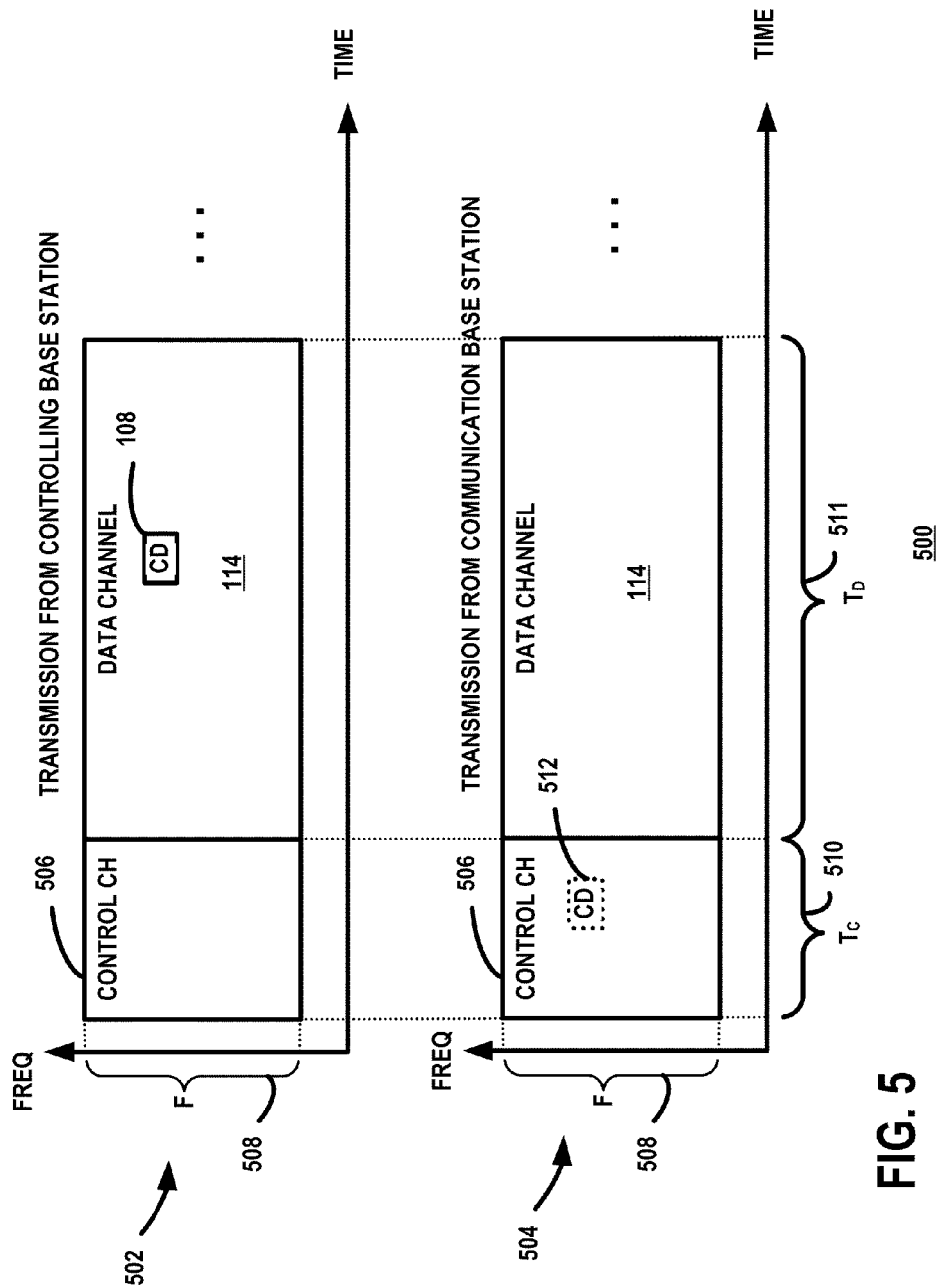
FIG. 5 is a graphical illustration of transmissions from the communication base station and the controlling base station.

FIG. 5 is a graphical illustration 500 of transmissions 502, 504 from the communication base station 102 and the controlling base station 104. Time-frequency resources are allocated for transmission of communication data and control data. A data channel 114 is defined in frequency and time and a control channel 506 is defined in frequency and time. The control channel 506 has a frequency band (F) 508 and is allocated a transmission time period ($T_C$) 510. The data channel 114 is allocated the frequency band (F) 508 and another time period ($T_D$) 511. For the example, the frequency band (F) 508 is divided into multiple orthogonal subcarrier tones in accordance with OFDM techniques. Each channel time period is divided into frames, sub-frames, and symbols in accordance with the communication specification. The resources are further distributed between the wireless communication devices using coding. Symbols and subcarriers in the data channel 506 are allocated to the wireless communication devices. In some circumstances, some information may be provided to the wireless communication device to assist the wireless communication device in locating the control data 108 within the control channel 114 intended for the wireless communication device 106. Typically, however, the wireless communication device searches the control channel 114 to find the control data 108. In conventional systems, each base station transmits control data to the wireless communication devices served by the base station. The control channel of the controlling base station and the control channel of the communication base station transmission have the same frequency band and time. The information conveyed in the control channels, however, is different. In the exemplary embodiment, control data 108 associated with the wireless communication device 106 communicating with the communication base station 102 is transmitted by the controlling base station 104 in the data channel 114. The time-frequency resources used for transmitting the control data 108 may be static or dynamic. In other words, the location of the control data 108 within the data channel may be fixed or may change. Further, the location within the channel may hop between different portions of data channel. The control data, for example, may hop across multiple sub-frames of the PDSCH with a pre-determined pattern. The wireless communication device 106 may be programmed with or may otherwise be made aware of the location of the control data 108 before operation in the system. In other situations, the wireless communication device 106 receives acquisition data from a base station providing the information necessary for the wireless communication device 106 to receive the control data 108. The control data 108 is coded in accordance with the coding for the intended wireless communication device 106.

The box with reference number 512 within the communication base station transmission 508 is illustrated with dashed lines to show that the control data 108 is not transmitted by the communication base station 102 in the exemplary embodiment but would have been transmitted in a conventional system. In some circumstances, the control data 108 may be transmitted by the controlling base station 104 and by the communication base station 102, although such an implementation may add interference and complexity in the system. In the exemplary embodiment the communication base station 102 refrains from transmitting any control information where control data 108 is transmitted by the controlling base station 104. Further, the communication base station 102 refrains from transmitting any signals within the control channel 506 in situations where a controlling base station 104 transmits control data 108. In addition, the communication base station 102 refrains from transmitting any signals within the time-frequency resources used by the controlling base station to transmit the control data 108. Such an arrangement minimizes interference and noise in situations where the wireless communication device is within the control base station geographic service area 402 and the communication base station geographical service area 404.

The transmission continues in time as illustrated by the dashed lines of the second transmissions of the control channel and the three dots in FIG. 5. The transmissions may include other channels and sub-channels not shown in FIG. 5. For example, broadcast messages, pilot signals, and synchronizing channels may be used.

Therefore, the communication system 100 includes a communication base station and a controlling base station where the controlling base station sends control data over a data channel to a wireless communication device communicating with the communication base station. The communication base station has a communication base station geographic service area and is configured to transmit data to the wireless communication device within the service area through a portion of a data channel. The controlling base station has a control base station geographical service area larger than the communication base station geographic service area. The controlling base station is configured to transmit control data to the wireless communication device through another portion of the data channel where the control data represents control information related to communication between the wireless communication device and the communication base station. In the exemplary embodiments, the power levels and timing of signals received at the wireless communication device 106 are closely monitored and the power levels and timing of the signals transmitted by the controlling base station in the data channel to the wireless communication device 106 are adjusted in accordingly.

Figure 6:
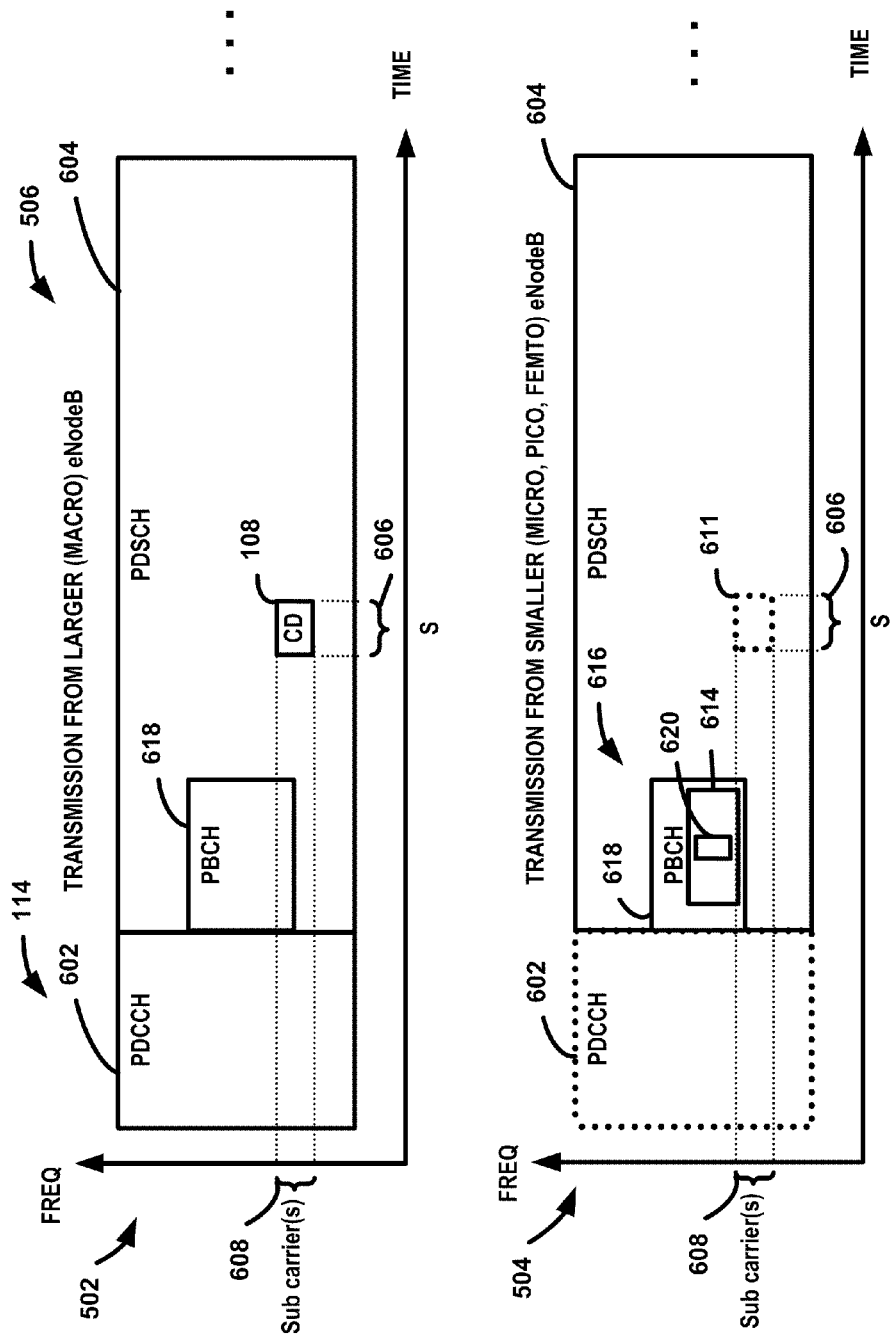
FIG. 6 is graphical illustration of the transmissions where the communication base station and the controlling base station operate in accordance with a 3GPP LTE communication specification.

FIG. 6 is graphical illustration 600 of the transmissions 502, 504 where the communication base station and the controlling base station operate in accordance with a 3GPP LTE communication specification. For the example of FIG. 6, the controlling base station 104 is an eNodeB with a geographical service area greater than geographical service area of an eNodeB that is operating as the communication base station. Accordingly, a larger service area (LSA) eNodeB, such a macro eNodeB has a larger service area than a smaller service area (SSA) eNodeB such as a Micro eNodeB, Pico eNodeB, or Femto eNodeB.

For the example of FIG. 6, the controlling base station transmission 502 is the larger service area eNodeB transmission (LSA transmission) and the communication base station transmission 504 is the smaller service area eNodeB transmission (SSA transmission) where the transmissions are formatted and transmitted in accordance with the 3GPP LTE communication specification. Therefore, the control channel 502 is a Physical Downlink Control Channel (PDCCH) 602 and the data channel 114 is a Physical Downlink Shared Channel (PDSCH) 604 for this example. The control data 108 is transmitted in the LSA transmission 502 within the PDSCH 604. The control data 108 is coded in accordance with the wireless communication device identification and the LSA eNodeB and is transmitted over symbols 606 and subcarriers 608 of the PDSCH 604. The time-frequency resources 611 in the PDSCH 604 in the SSA transmission 504 that correspond to subcarriers 608 and time 606 used to transmit the control data in the PDSCH of the LSA transmission 502 are not used for any data. Therefore, the SSA eNodeB refrains from transmitting within time-frequency resources 611 of the PDSCH 604. Accordingly, the controlling base station transmits the control data in a portion of the data channel during a time when the communication base station is not transmitting in the portion of the data channel.

The communication base station therefore, refrains from transmitting any signals within the time-frequency resources used by the controlling base station for transmitting the control data. Further, the SSA eNodeB refrains from transmitting in the PDCCH 602.

For this example, communication acquisition information 614 is transmitted within the broadcast channel 616. The communication acquisition information 614 includes all additional information required for a wireless communication device 106 entering the service area to configure its receiver to receive and decipher transmitted control data. Accordingly, the communication acquisition information 614 includes the scrambling code of the eNodeB transmitting the control channel and timing information if needed, for example.

In the exemplary embodiment, the communication acquisition information 614 in the broadcast channel within the SSA eNodeB transmission (communication base station transmission 504) indicates that the LSA eNodeB will be transmitting the control data 108 to the wireless communication device 106. The communication acquisition information 614 includes the information that allows the wireless communication device to receive the control data 108 from the LSA eNodeB (controlling base station 104). In this embodiment, the broadcast channel 616 is a Broadcast Channel (BCH) transmitted over the Physical Broadcast Channel (PBCH) 618 in accordance with the 3GPP LTE communication specification.

The broadcast channel includes an indicator 620, such a one bit flag, indicating to the user equipment (UE) (wireless communication device 106) that the LSA eNodeB will be transmitting the control data 108. In some circumstances the indicator 620 may be omitted.

Figure 7:
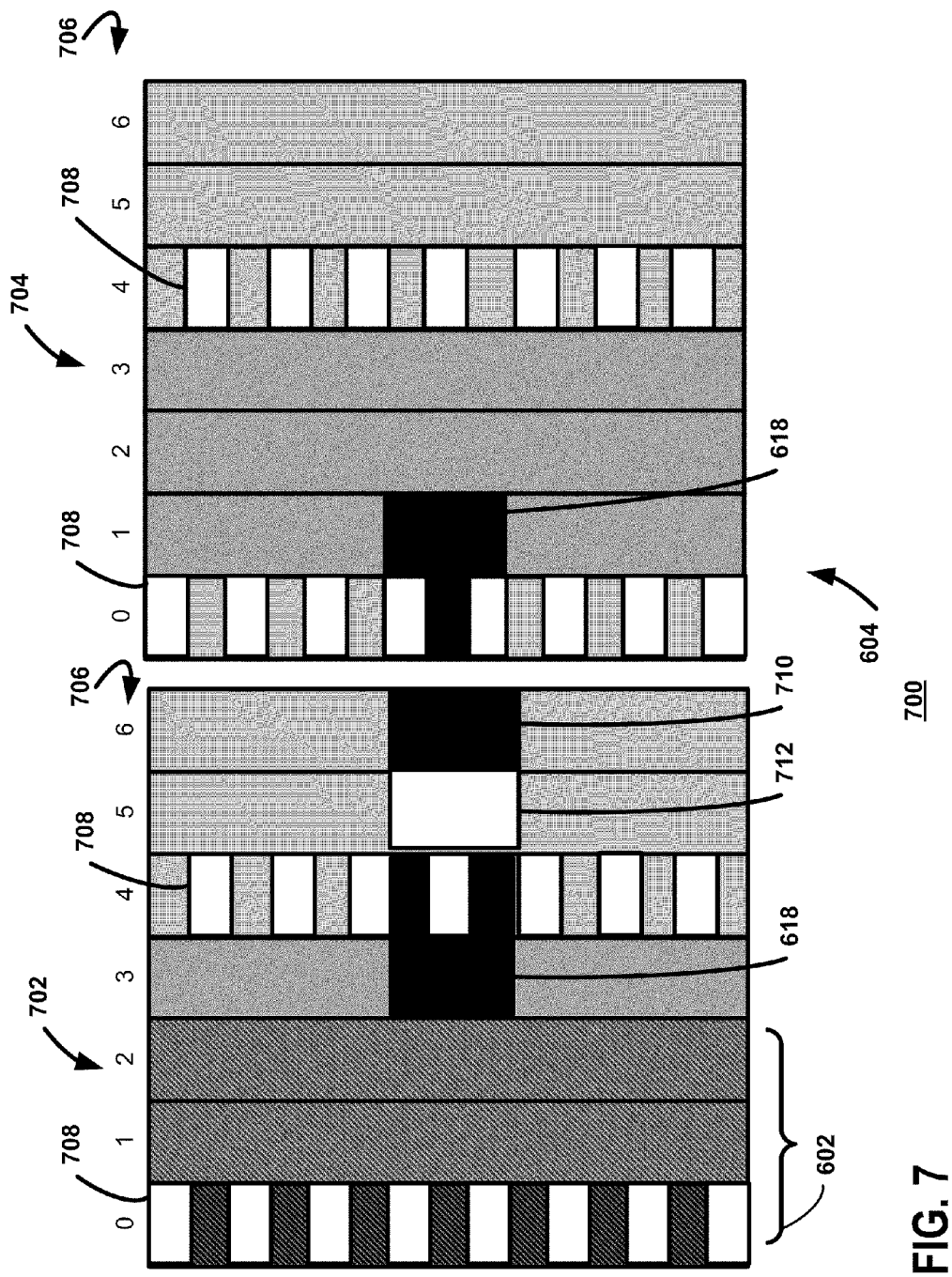
FIG. 7 is an illustration of a sub-frame in accordance with a 3GPP Long Term Evolution (LTE) communication specification.

FIG. 7 is an illustration of a sub-frame 700 in accordance with a 3GPP LTE communication standard. The sub-frame 700 includes two slots 702, 704, where each slot includes seven symbol times 706. The symbol times 0, 1 and 2 in the first slot 702 form the PDCCH 602. Pilot signals 708 are injected at symbol times 0 and 4. The broadcast channel is the PBCH spans portions of symbols time 3 and 4 of the first slot 702 and portions of symbol time 0 and 1 of the second slot 704. The PDSCH 604 includes is covered by the remainder of symbol times 3-6 of the first slot 702 and symbol times 1-6 of the second slot 704. The sub-frame 700 also includes a primary synchronization channel (P-SCH) 710 and a secondary synchronization channel (S-SCH) 712.

Figure 8:
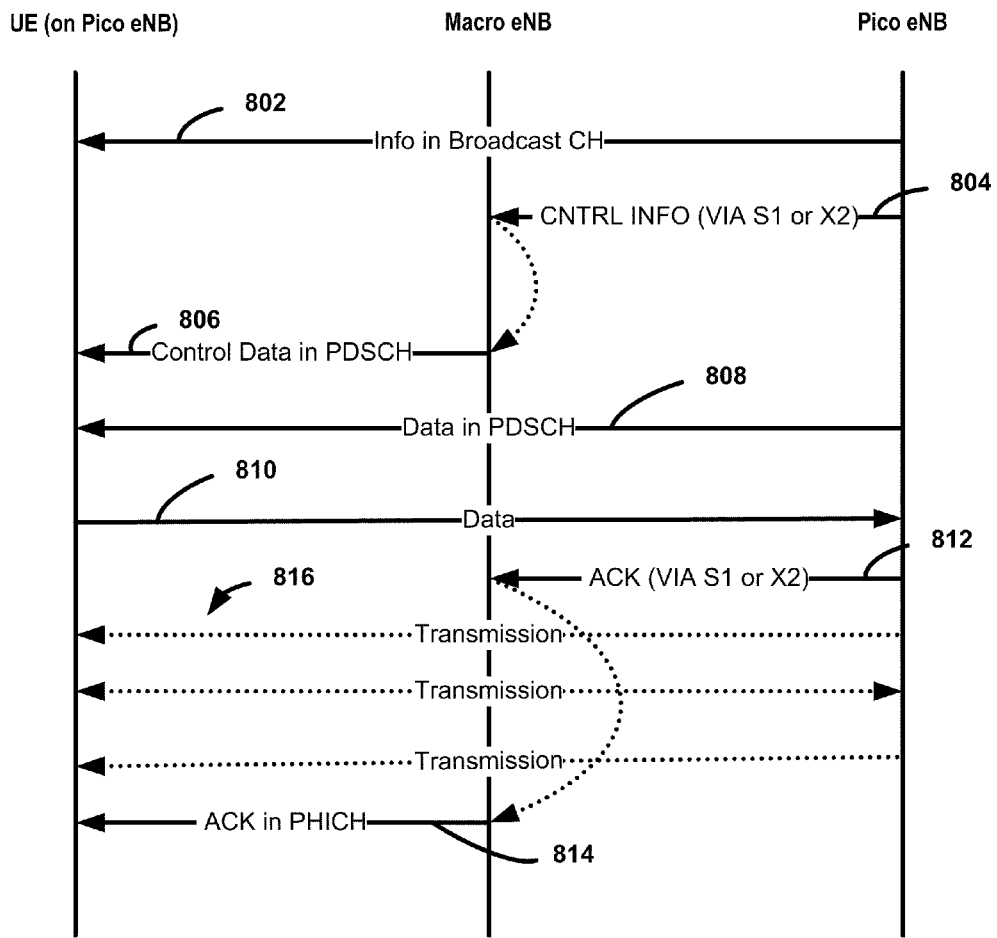
FIG. 8 is a transmission timing diagram for exemplary transmissions in a communication system.
Figure 9:
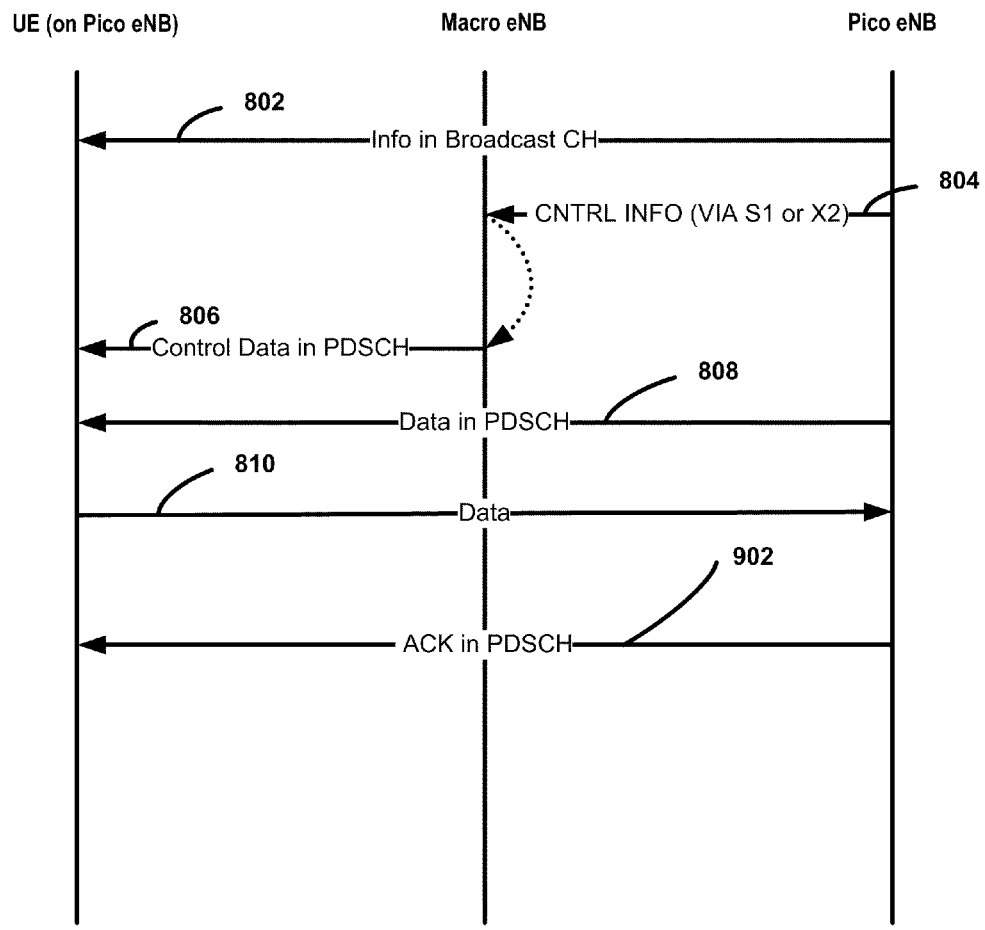
FIG. 9 is a transmission timing diagram for exemplary transmissions in a communication system where acknowledgments are transmitted within the data channel.

FIG. 8 is a transmission timing diagram for exemplary transmissions in a communication system 100. The timing diagrams of FIG. 8 and FIG. 9 represent only examples of transmission timings. Other scenarios are possible. For example, transmissions 802 and 804 may be simultaneous in some circumstances. For the example of FIG. 8, the communication base station 102 is a Pico eNodeB and the controlling base station is a Macro eNodeB where the geographical service area of the Pico eNodeB is within the geographical service area of the Macro eNodeB. Transmissions may occur in the system 100 that are not reflected in transmission timing diagram of FIG. 8.

During transmission 802, the Pico eNodeB transmits communication acquisition information 620 over the P-SCH, S-SCH, and PBCH to the UE (wireless communication device 106) that will receive data from the Pico eNodeB. After synchronization with the pico eNodeB using P-SCH and S-SCH channels, the PBCH is received. The communication acquisition information 620 in the PBCH provides information to the UE to allow the UE to receive the control data 108 from the Macro eNodeB.

During transmission 804, the Pico eNodeB sends the control information 110 to the Macro eNodeB. As discussed above, the control information 110 may sent over X2 signaling connection where available or through a core network using S1 signaling.

During transmission 806, the Macro eNodeB transmits the control data 108 over the PDSCH 604 to the UE. The control data 108 provides the UE with the control information necessary to communicate with the Pico eNodeB. In this example, the Pico eNodeB does not transmit its own PDCCH (the channel remains blank).

During transmission 808, the Pico eNodeB transmits communication data to the UE over the PDSCH.

During transmission 810, the UE transmits a transmission that may contain communication data control data to the Pico eNodeB.

During transmission 812, the Pico eNodeB transmits an acknowledgment (ACK) information to the Macro eNodeB. The acknowledgment information may be negative acknowledgment (NACK) in some circumstances. The ACK provides feedback regarding whether a communication sent by the UE was successfully received.

During transmission 814, the Macro eNodeB sends an ACK message over the PHICH that corresponds to the ACK information received from the Pico eNodeB. In this example, therefore, the ACK is first sent to the Macro eNodeB over a S1 or X2 connection and forwarded by the Macro eNodeB to the UE. The PHICH is transmitted over the PDCCH or over a separate channel within PDSCH region.

Due to delays in the backhaul and processing, transmissions 816 to and from the UE may occur before the PHICH is sent from the Macro eNodeB. The UE includes sufficient memory to buffer communication so that if a transmission is not successfully received at the Pico eNodeB, the UE can retrieve the appropriate data for retransmission. Accordingly, a larger buffer may be used in the system as compared to conventional systems where the ACK is received from the Pico eNodeB.

FIG. 9 is a transmission timing diagram for exemplary transmissions in a communication system 100 where acknowledgments are transmitted within the data channel. For the example of FIG. 9, the communication base station 102 is a Pico eNodeB and the controlling base station is a Macro eNodeB where the geographical service area of the Pico eNodeB is within the geographical service area of the Macro eNodeB. Transmissions may occur in the system 100 that are not reflected in transmission timing diagram of FIG. 8. Transmissions 802-810 are performed as described above with reference to FIG. 8.

During transmission 902, the Pico eNodeB transmits the ACK to the UE over the PDSCH. Therefore, instead of sending the acknowledgment to the Macro eNodeB for transmission to the UE in the PHICH channel, the Pico eNodeB transmits the acknowledgment directly to the UE using the data channel (PDSCH).

Figure 10:
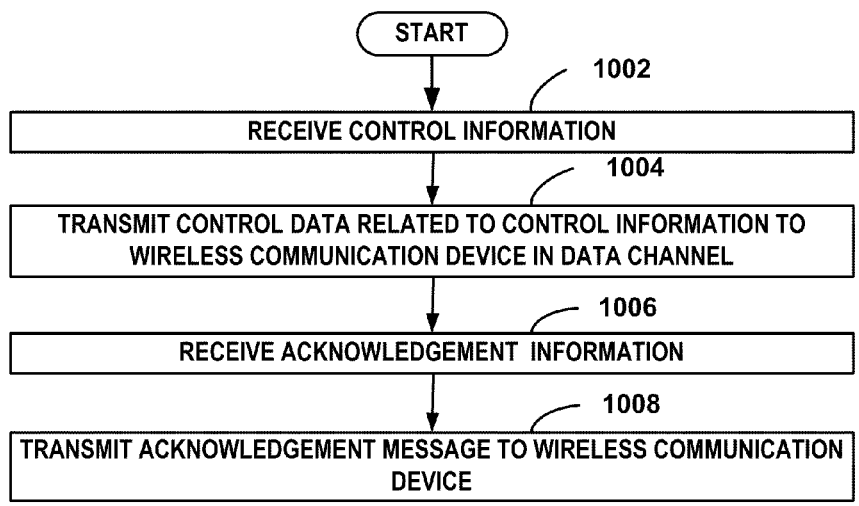
FIG. 10 is a flow chart of a method performed at the controlling base station.

FIG. 10 is a flow chart of a method performed at the controlling base station 104. Although the method may be performed using any combination of code and/or hardware, the method is formed by executing code on the controller 126 within the controlling base station 104 in the exemplary embodiment.

At step 1002, the control information 110 is received. The control information 110 is received through the network interface 116 wherein the network interface 116 may be connected to a core network 202 or to the communication base station 102. The control information 110 includes information related to the communication between the communication base station 102 and the wireless communication device 106 and, when received at the wireless communication device 106, enables the wireless communication device 106 to communicate with the communication base station 102. Where the controlling base station is connected to the core network 202, the control information 110 may be received over a connection 208 using S1 signaling. Where the controlling base station 104 is connected to the communication base station 104, the control information 110 may be received over a connection 302 using X2 signaling.

At step 1004, the control data 108 based on the control information 110 is transmitted to the wireless communication device 106. Using communication acquisition information that is transmitted by the communication base station over the broadcast channel, the transmitter 118 in the controlling base station 104 transmits the control data within the data channel 114. In some circumstances, the controlling base station transmits the control data in a portion of the data channel during a time that the communication base station is not transmitting any signals in that portion. The communication base station therefore, refrains from transmitting any signals within the time-frequency resources used by the controlling base station for transmitting the control data.

At step 1006, acknowledgment information is received from the communication base station.

At step 1008, an acknowledgment message based on the acknowledgment information is transmitted to the wireless communication device 106. The transmitter transmits the acknowledgment message through the PHICH channel where the system operates in accordance with a 3GPP LTE specification. Steps 1006 and 1008 are omitted in implementations where the communication base station 102 transmits the acknowledgment message over the data channel.

Figure 11:
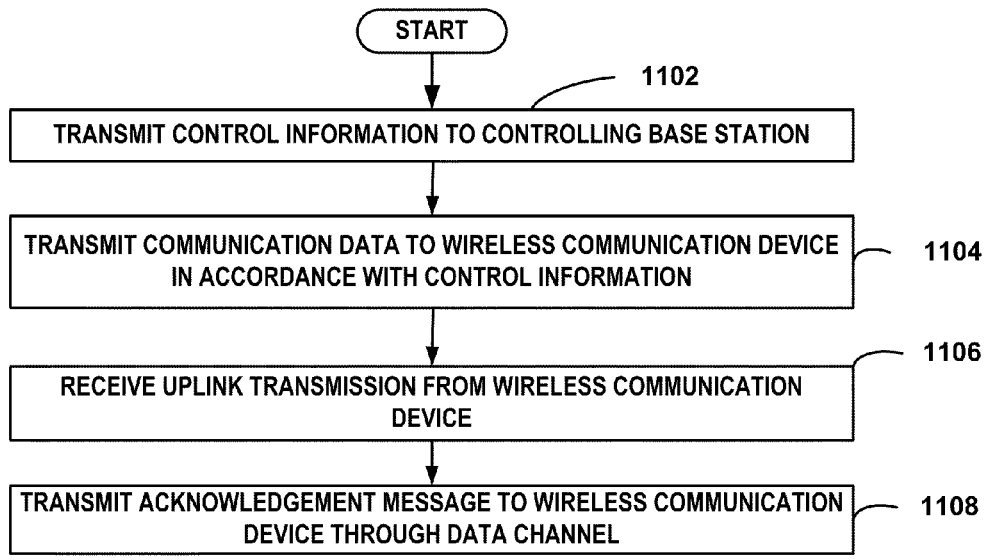
FIG. 11 is a flow chart of a method performed at the communication base station.

FIG. 11 is a flow chart of a method performed at the communication base station 102. Although the method may be performed using any combination of code and/or hardware, the method is formed by executing code on the controller 124 within the communication base station 102 in the exemplary embodiment.

At step 1102, the control information 110 is transmitted to the controlling base station 104. The control information 110 is transmitted through the network interface 204 where the network interface 204 may be connected to a core network 202 or to the controlling base station 104. The control information 110 includes information related to the communication between the communication base station 102 and the wireless communication device 106 and, when received at the wireless communication device 106, enables the wireless communication device 106 to communicate with the communication base station 102. Where the communication base station 102 is connected to the core network 202, the control information 110 may be transmitted over a connection 206 using 51 signaling. Where the communication base station 102 is connected to the controlling base station 104, the control information 110 may be transmitted over a connection 302 using X2 signaling.

At step 1104, communication data is transmitted in accordance with the control information. The communication data is transmitted over the data channel.

At step 1106, an uplink transmission is received from the wireless communication device 106.

At step 1108, an acknowledgment message is transmitted to the wireless communication device over the data channel. The acknowledgment message indicates successful reception of the uplink transmission. Alternatively, the communication base station can transmit the acknowledgment information to the controlling base station 104 for transmission as an acknowledgment message in the PHICH.

Figure 12:
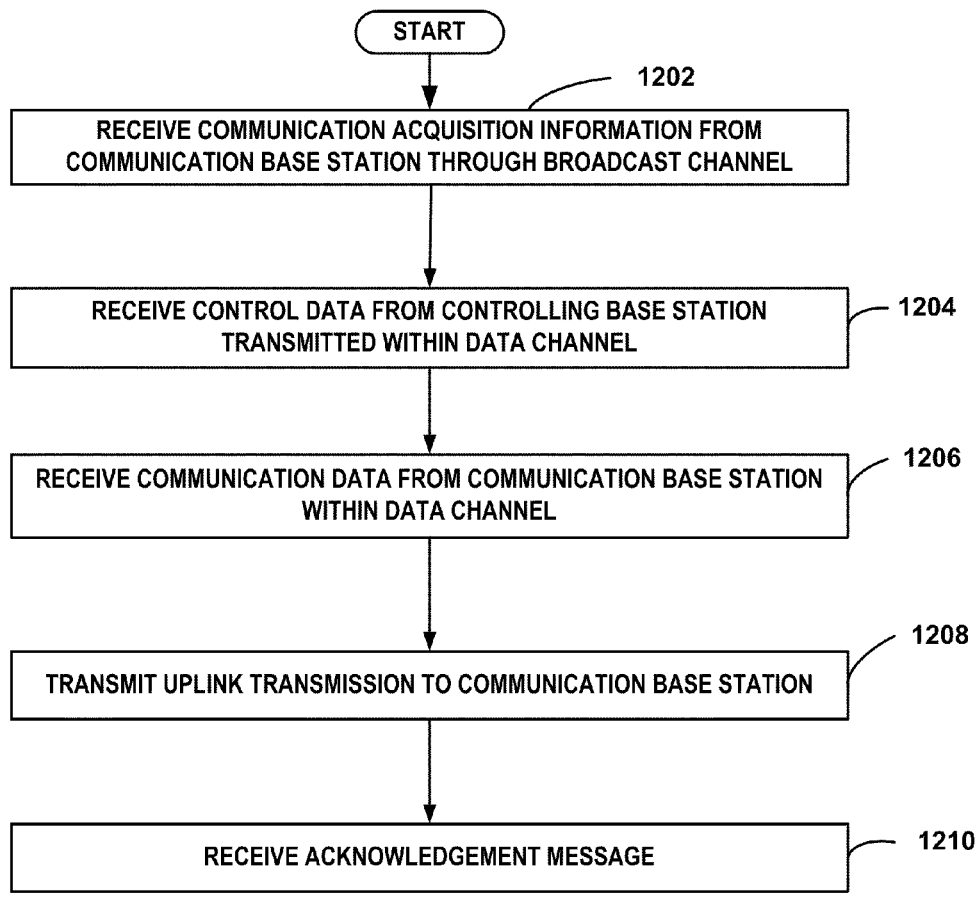
FIG. 12 is a flow chart of a method performed at the wireless communication device.

FIG. 12 is a flow chart of a method performed at the wireless communication device 106. Although the method may be performed using any combination of code and/or hardware, the method is formed by executing code on the controller 132 within the wireless communication device 106 in the exemplary embodiment.

At step 1202, communication acquisition information is received from the communication base station 102 through the broadcast channel.

A step 1204, control data 108 is received from the controlling base station 104 through the data channel 114. The receiver 130 is configured in accordance with the communication acquisition information to enable the wireless communication device 106 to receive the control data. The control data 108 represents the control information 110 which includes information related to the communication between the communication base station 102 and the wireless communication device 106 and, when received at the wireless communication device 106, enables the wireless communication device 106 to communicate with the communication base station 102.

At step 1206, communication data is received from the communication base station 102. Using the control data 108 received from the controlling base station 104, the receiver 130 is configured to receive communications from the communication base station 102.

At step 1208, the wireless communication device 106 transmits an uplink transmission to the communication base station 102. Using the control data 108 received from the controlling base station 104, the transmitter 128 is configured to transmit uplink communications to the communication base station 102.

At step 1208, an acknowledgment message is received at the wireless communication device. In situations where the communication base station 102 sends the acknowledgment message, the acknowledgment message is received over the data channel. In situations where the controlling base station sends the acknowledgment message, the acknowledgment message is received over the PHICH channel.

Therefore, the control data transmission management discussed above provides that a base station with a large coverage area transmit the control information for base stations having smaller coverage areas within the larger coverage area. Control channels are designed to be robust by having lower rate coding, higher power, and other parameters which allow the wireless communication devices to more easily receive and decode the control information. As a result, wireless communication devices communicating with the smaller area base stations can, in most circumstances, easily receive the control signals from the larger area base stations while communicating with the smaller area base stations. The control data transmission management discussed herein, therefore, takes advantage of the robustness of the high power of the larger area base stations and reduces interface by allowing the small area base stations to refrain from transmitting control signals. The system can be further optimized by allocating frequencies to particular base stations and wireless communication devices under certain scenarios. Some examples where the control management techniques may used to minimize interference include situations where a Pico eNodeB is transmitting to users in a building and a macro eNodeB is transmitting to users outside the building. By transmitting control signals from the macro eNodeB to the users in the building instead of from the Pico eNodeB, the Pico eNodeB does not cause interface with users outside the building using the macro eNodeB. Other interference scenarios and techniques for broadcasting overhead parameters that may be coupled with the teachings herein are presented in US Patent Publication US 2008/0279168, published Nov. 13, 2008, Ser. No. 11/746,501, and entitled "SYSTEM AND METHOD FOR BROADCASTING OVERHEAD PARAMETERS IN POOR COVERAGE REGIONS", which is incorporated by reference in its entirety, herein.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A controlling base station comprising:
a transmitter configured to transmit control data to a wireless communication device communicating, in accordance with a communication specification, with a communication base station, the control data:
transmitted to allow reception by the wireless communication device of the control data within a data channel having a frequency and time allocated by the communication specification for the wireless communication device to receive data transmissions from the communication base station; and
representing control information related to communication between the wireless communication device and the communication base station.

2. The controlling base station of claim 1, further comprising a network interface configured to receive the control information from the communication base station.

3. The controlling base station of claim 2, wherein the network interface is configured to receive the control information through a core network.

4. The controlling base station of claim 1, wherein the communication base station has a geographical service area that at least partially overlaps a controlling base station geographical service area of the controlling base station.

5. The controlling base station of claim 1, wherein:
the controlling base station and the communication base station operate in accordance with a 3GPP Long Term Evolution (LTE) communication specification;
the controlling base station is a larger service area (LSA) eNodeB,
the communication base station is a smaller service area (SSA) eNodeB having a smaller geographical service area than a geographical service area of the LSA eNodeB; and
the control data is transmitted within a Physical Downlink Control Channel (PDCCH).

6. The controlling base station of claim 5, wherein the LSA eNodeB is a Macro eNodeB and the SSA eNodeB is selected from a Micro eNodeB, Pico eNodeB and Femto eNodeB.

7. The controlling base station of claim 1, wherein the transmitter is further configured to transmit an acknowledgment message to the wireless communication device, the acknowledgment message indicating whether an uplink transmission from the wireless communication device to the communication base station was successfully received at the communication base station.

8. The controlling base station of claim 7, further comprising a network interface configured to receive acknowledgment information indicating whether the uplink transmission was successfully received, the acknowledgment message based on the acknowledgment information.

9. The controlling base station of claim 1, wherein the control data is transmitted in accordance with communication acquisition information transmitted by the communication base station to the wireless communication device within a broadcast channel.

10. A communication system comprising:
a communication base station having a communication base station geographic service area and configured to transmit data to a wireless communication device through a portion of a data channel, the data channel defined by a communication specification; and
a controlling base station having a control base station geographical service area larger than the communication base station geographic service area and configured to transmit control data to the wireless communication device through another portion of the data channel, the control data representing control information related to communication between the wireless communication device and the communication base station.

11. The communication system of claim 10, wherein:
the controlling base station and the communication base station operate in accordance with a 3GPP Long Term Evolution (LTE) communication specification;
the controlling base station is a larger service area (LSA) eNodeB;
the communication base station is a smaller service area (SSA) eNodeB having a smaller geographical service area than a geographical service area of the LSA eNodeB; and
the control data is transmitted within a Physical Downlink Control Channel (PDCCH).

12. The communication system of claim 11, wherein the LSA eNodeB is a Macro eNodeB and the SSA eNodeB is selected from a Micro eNodeB, Pico eNodeB and Femto eNodeB.

13. The communication system of claim 10, wherein the communication base station is further configured to transmit communication acquisition information to the wireless communication device within a broadcast channel, the communication acquisition information enabling the wireless communication device to receive the control data from the controlling base station.

14. The communication system of claim 10, wherein the controlling base station comprises:
a network interface configured to receive the control information from the communication base station.

15. The communication system of claim 14, further comprising a core network connecting the controlling base station and the communication base station, wherein the network interface is configured to receive the control information through the core network.

16. The communication system of claim 10, wherein the communication base station is further configured to refrain from transmitting any signals within the another portion of the data channel during a transmission time of the control data by the controlling base station.

17. A method of managing control data in a communication system, the method comprising:

transmitting control data to a wireless communication device communicating, in accordance with a communication specification, with a communication base station, the control data:
  transmitted to allow reception by the wireless communication device of the control data within a data channel having a frequency and time allocated by the communication specification for the wireless communication device to receive data transmissions from the communication base station; and
  representing control information related to communication between the wireless communication device and the communication base station.

18. The method of claim 17, further comprising:
receiving the control information from the communication base station.

19. The method of claim 17, further comprising:
transmitting communication acquisition information from the communication base station through a broadcast channel to the wireless communication, the communication acquisition information enabling the wireless communication device to receive the control data from a controlling base station transmitting the control data.

20. The method of claim 17, wherein:
  the controlling base station and the communication base station operate in accordance with a 3GPP Long Term Evolution (LTE) communication specification;
  the controlling base station is a larger service area (LSA) eNodeB;
  the communication base station is a smaller service area (SSA) eNodeB having a smaller geographical service area than a geographical service area of the LSA eNodeB; and
  the control data is transmitted within a Physical Downlink Control Channel (PDCCH).

21. The method of claim 17, wherein the transmitting of control data comprises transmitting the control data within a portion of the data channel at a time when communication base station is not transmitting signals within the portion of the data channel.

* * * * *